(12) United States Patent
Kim et al.

(10) Patent No.: US 10,379,735 B2
(45) Date of Patent: Aug. 13, 2019

(54) PORTABLE TERMINAL AND METHOD OF UTILIZING BACKGROUND IMAGE OF PORTABLE TERMINAL

(75) Inventors: Kyung Min Kim, Suwon-si (KR); Sung Ho Park, Suwon-si (KR); Sang Ho Hong, Suwon-si (KR); Seung Bae Pyon, Seoul (KR); Yong Woog Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1518 days.

(21) Appl. No.: 13/303,428

(22) Filed: Nov. 23, 2011

(65) Prior Publication Data

US 2012/0131509 A1    May 24, 2012

(30) Foreign Application Priority Data

Nov. 24, 2010 (KR) .................... 10-2010-0117428

(51) Int. Cl.
G06F 3/048 (2013.01)
G06F 3/0488 (2013.01)

(52) U.S. Cl.
CPC ................... G06F 3/04886 (2013.01)

(58) Field of Classification Search
None
See application file for complete search history.

(56) References Cited

U.S. PATENT DOCUMENTS

| 5,737,553 | A | * | 4/1998 | Bartok | G06F 3/04842 |
| | | | | | 715/764 |
| 5,767,855 | A | | 6/1998 | Bardon et al. | |
| 8,635,549 | B2 | * | 1/2014 | Perry | G06F 3/0488 |
| | | | | | 715/769 |
| 2005/0253817 | A1 | * | 11/2005 | Rytivaara | G06F 3/04883 |
| | | | | | 345/173 |
| 2007/0086773 | A1 | * | 4/2007 | Ramsten | G06F 3/0482 |
| | | | | | 396/287 |
| 2008/0005698 | A1 | * | 1/2008 | Koskinen | G06F 3/0481 |
| | | | | | 715/835 |
| 2010/0060655 | A1 | * | 3/2010 | Huang | H04N 1/32122 |
| | | | | | 345/543 |
| 2010/0077356 | A1 | * | 3/2010 | Kiiskinen | G06F 3/0481 |
| | | | | | 715/835 |
| 2010/0167712 | A1 | * | 7/2010 | Stallings | G06F 3/0485 |
| | | | | | 455/418 |

(Continued)

FOREIGN PATENT DOCUMENTS

| KR | 10-2009-0065766 A | 6/2009 |
| KR | 10-2009-0122040 A | 11/2009 |
| KR | 10-2010-0065136 A | 6/2010 |

*Primary Examiner* — Stephen S Hong
*Assistant Examiner* — Sanchita Roy
(74) *Attorney, Agent, or Firm* — Jefferson IP Law, LLP

(57) ABSTRACT

A method of utilizing a background image of a portable terminal, and a portable terminal for implementing the method, are provided. The method includes displaying the background image, determining whether an input event is detected in the displayed background image, identifying a coordinate of an area in which the input event is detected upon detection of the input event, determining whether there exists a function mapped to the identified coordinate, and performing the function if there exists the function mapped to the identified coordinate.

17 Claims, 6 Drawing Sheets

(56) References Cited

U.S. PATENT DOCUMENTS

| | | | |
|---|---|---|---|
| 2010/0245241 A1* | 9/2010 | Kim | H04M 1/72583 345/156 |
| 2011/0029904 A1* | 2/2011 | Smith | G06F 9/451 715/765 |
| 2012/0329441 A1* | 12/2012 | Tseng | G01C 21/265 455/418 |
| 2013/0047124 A1* | 2/2013 | Holland | G06F 3/0482 715/835 |

\* cited by examiner

PORTABLE TERMINAL AND METHOD OF UTILIZING BACKGROUND IMAGE OF PORTABLE TERMINAL

PRIORITY

This application claims the benefit under 35 U.S.C. § 119(a) of a Korean patent application filed on Nov. 24, 2010 in the Korean Intellectual Property Office and assigned Ser. No. 10-2010-0117428, the entire disclosure of which is hereby incorporated by reference

BACKGROUND OF THE INVENTION

1. Field of the Invention

The present invention relates to a portable terminal and a method of utilizing a background image of the portable terminal. More particularly, the present invention relates to a portable terminal and a method of performing various functions by using a background image displayed on the portable terminal.

2. Description of the Related Art

Due to developments in the communication industry and the rapid growth of mobile communication services, a portable terminal has become a necessity of modern life. The portable terminal is capable of providing various functions in addition to basic features of the portable terminal to meet customer demands for improved services. For example, the portable terminal can have additional features such as a background screen setting function, a Short Message Service (SMS) function, a Moving Picture Experts Group (MPEG)-1 or MPEG-2 Audio Layer 3 (MP3) function, an Internet function, a camera function or a TeleVision (TV) function.

The background screen setting function allows a user to select and display various images on a screen of the portable terminal. Also, the images available for display in the background screen setting function can include images downloaded from other portable terminals or the Internet, or images captured by the user through a camera. Accordingly, each user may have a different background image for his or her portable terminal.

The background image used in a portable terminal of the related art is merely for display. However, in order to select a particular function of the portable terminal, the user chooses a screen showing a particular icon, for example, a menu or a widget in a background image screen. That is, in order for the user to perform the particular function, the user switches from the background image of the portable terminal to a menu screen or widget screen containing an icon for performing the particular function.

SUMMARY OF THE INVENTION

Aspects of the present invention are to address at least the above-mentioned problems and/or disadvantages and to provide at least the advantages described below.

In accordance with an aspect of the present invention, a method of utilizing a background image of a portable terminal is provided. The method includes displaying the background image, determining whether an input event is detected in the displayed background image, identifying a coordinate of an area in which the input event is detected upon detection of the input event, determining whether there exists a function mapped to the identified coordinate, and performing the function if there exists the function mapped to the identified coordinate.

In accordance with an aspect of the present invention, a portable terminal is provided. The terminal includes a display unit for displaying the background image, a touch screen for identifying a coordinate of an area in which an input event is detected upon detection of the input event, and a transparent icon management unit for determining whether there exists a function mapped to the coordinate identified through the touch screen and for performing the function if there exists the function mapped to the identified coordinate.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term 'portable terminal,' used herein, refers to any type of a data processing apparatus that is capable of processing data received from an external source or generated by a user. Here, the portable terminal can display an image set by the user in a particular mode such as a standby mode or a lock mode. Also, for illustrative purposes, it is assumed herein that the portable terminal is a mobile communication terminal.

The term 'background image,' used herein, refers to an image displayed in a particular mode such as the standby mode or the lock mode of the portable terminal. Here, the background image can be selected by the user and periodically downloaded from an external terminal.

The term 'transparent icon,' used herein, refers to a particular area of the background image, which is mapped to a function.

Exemplary embodiments of the present invention enable the user to select a desired function by using the background image displayed in the portable terminal. To this end, in the exemplary embodiments of the present invention, at least one function is mapped to the background image of the portable terminal and is performed when selected by the user among the at least one function mapped to the background image.

Figure 1:
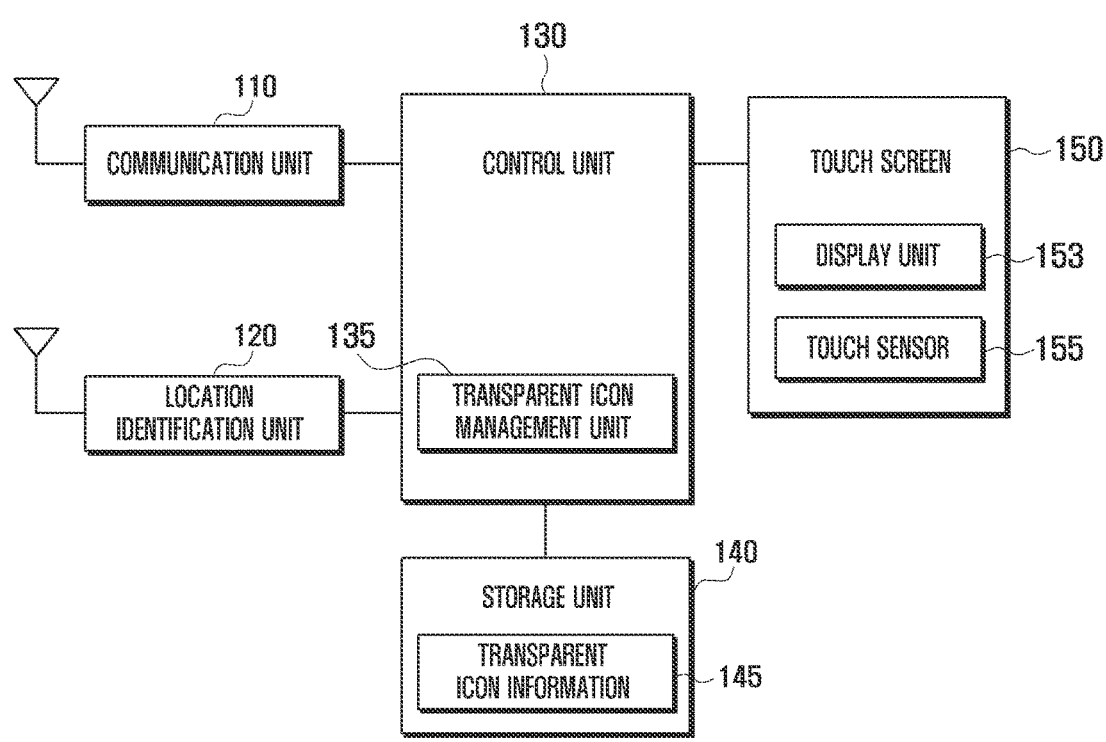
FIG. 1 illustrates a construction of a portable terminal according to an exemplary embodiment of the present invention.

FIG. 1 illustrates a construction of a portable terminal according to an exemplary embodiment of the present invention.

Referring to FIG. 1, the portable terminal according to an exemplary embodiment of the present invention includes a communication unit 110, a location identification unit 120, a control unit 130, a storage unit 140, and a touch screen 150. According to exemplary embodiments of the present invention, the portable terminal may include additional and/or different units, or omit any number of the units shown in FIG. 1. Similarly, the functionality of two or more units may be integrated into a single component.

The communication unit 110 performs communication of the portable terminal. For example, the communication unit 110 can establish a communication channel with a mobile communication system to perform at least one of a voice communication, a video communication, and a data communication such as, for example, text messaging and image sharing. The communication unit 110 can include a Radio Frequency (RF) transmitter for performing a frequency up conversion and amplification of a transmission signal and an RF receiver for performing low noise amplification and a frequency down conversion of a received signal.

The location identification unit 120 receives location information to identify the location of the portable terminal. Here, the location identification unit 120 can be a Global Positioning System (GPS) receiver. When the location identification unit 120 is the GPS receiver, the location identification unit 120 receives satellite information transmitted by a GPS satellite. Also, the location identification unit 120 may periodically receive the satellite information transmitted by the GPS satellite at predetermined intervals. In addition, the satellite information may include ephemeris data, which is used to calculate the position of the GPS satellite, almanac data, which is orbital information, and GPS time data. Also, although the location identification unit 120 is described as being implemented using the GPS receiver in the present exemplary embodiment, the present invention is not limited thereto. In other words, the location identification unit 120 can receive the information of the current location of the portable terminal from a base station.

The control unit 130 controls an overall operation of each element of the portable terminal. In an exemplary embodiment of the present invention, the control unit 130 can map the background image to corresponding functions according to a user's choice and store the background image mapped to the corresponding functions in the storage unit 140. Also, when the input event is detected on the background image through the touch screen 150, the control unit 130 can perform a function mapped to an area in which the input event is detected. In addition, the control unit 130 can identify the location of the portable terminal through the location identification unit 120 and display the background image mapped to the identified location on the display unit 153. To this end, the control unit 130 includes a transparent icon management unit 135.

The transparent icon management unit 135 can map a particular area of the background image to a function, which is selected by a user, and store the mapping in the storage unit 140. Also, the transparent icon management unit 135 can perform the function mapped to the area in which the input event is detected in the background image according to a user's choice. In addition, the transparent icon management unit 135 can change the background image according to the current location of the portable terminal.

More specifically, the transparent icon management unit 135 can control the display unit 153 in the standby mode or in the lock mode to display the background image. Also, the transparent icon management unit 135 can change a currently displayed background image to a preset background image according to the current location of the portable terminal identified by the location identification unit 120. If the input event is detected in the background image when the portable terminal is in the lock mode, the transparent icon management unit 135 can cancel the lock mode based on the coordinate of the detected input event. In other words, the transparent icon management unit 135 identifies the coordinate of the input event detected in the background image displayed on the display unit 153. Also, the transparent icon management unit 135 cancels the lock mode when the identified coordinate corresponds with a coordinate for canceling the lock mode stored in the storage unit 140. Here, in addition to comparing the coordinates, the transparent icon management unit 135 compares an input order stored in the storage unit 140 and an order of the input event being detected to determine whether to cancel the lock mode.

Also, when the input event is detected in the background image in the standby mode, the transparent icon management unit 135 identifies the coordinate of an area in which the input event is detected. In addition, the transparent icon management unit 135 determines whether the identified coordinate is mapped to a function by using the storage unit 140. If there is a mapping of the function, the transparent icon management unit 135 performs the corresponding function.

The transparent icon management unit 135 can map a particular area of the background image to a function selected by the user and store the mapping in the storage unit 140. Here, the particular area of the background image to which the function is mapped is referred to as a transparent icon. If a transparent icon setting function is selected, the transparent icon management unit 135 displays the background image selected by the user on the display unit 153.

Also, when the input event is detected in the background image displayed through the touch screen 150, the transparent icon management unit 135 identifies the coordinate of an area in which the input event is detected. Next, when the user selects the function to be mapped, the transparent icon management unit 135 stores the identified coordinate and the selected function in the storage unit 140 as transparent icon information 145 together with the background image. Here, the transparent icon information 145 can be stored in a table format and includes information of the background image, the coordinate and the function mapped to the coordinate.

Next, the transparent icon management unit 135 can edit the function mapped to the background image and the area to which the function is mapped. More specifically, when a transparent icon editing function is selected, the transparent icon management unit 135 displays a selected background image on the display unit 153. Here, the transparent icon management unit 135 displays a function and an area to which the function is mapped on the background image in the display unit 153. Also, the transparent icon management unit 135 can additionally map a function to an area in which the input event is detected in the background image according to a user's selection and store the mapping in the storage unit 140. Further, when at least one area of the background image to which a function is mapped is selected, the transparent icon management unit 135 can delete the selected area and the function mapped thereto from the storage unit 140. Namely, the transparent icon management unit 135 can delete a corresponding coordinate of the selected area and the function mapped thereto from the transparent icon information 145.

In this manner, by using the transparent icon management unit 135, the control unit 130 can perform a function corresponding to an area of the background image in which the input event is detected. Hereafter, for convenience in description, functions performed by the transparent icon management unit 135 or the control unit 130 will not be separately described. Instead, functions performed by the transparent icon management unit 135 or the control unit 130 will be collectively described as being performed by the control unit 130.

The control unit 130 can control the display unit 153 to display functions mapped to a particular area of the background image. Also, when each particular area of the background image has detailed information thereof, the control unit 130 can control the display unit 153 to display the detailed information along with the function mapped thereto. For example, if the background image is a map, the control unit 130 can control the display unit 153 to display the detailed information of a building or the name of a place shown on the map. Also, the control unit 130 can control the display unit 153 to display a function mapped to each area of the map with the detailed information thereof.

The storage unit 140, under the control of the control unit 130, stores data generated by an element of the portable terminal depending on an operation or state thereof. Here, under the control of the control unit 130, the storage unit 140 stores information of the background image that is to be changed according to the location of the portable terminal. In other words, the storage unit 140 can store the coordinate of the location of the portable terminal together with the background image.

In addition, the storage unit 140 stores the transparent icon information 145 about the coordinate of a particular area of the background image and a function mapped thereto, under the control of the control unit 130. Here, the coordinate of the particular area can be defined as being within a preset range, which can be adjusted by the user. For illustrative purposes, the coordinate in which the input event is detected is represented as (x, y). If the input event is detected at a coordinate of (0, 0) and the preset range is ±5, the coordinate (x, y) is stored in the storage unit 140 as (−5, −5)≤(x, y)≤(5, 5). Also, under the control of the control unit 130, the storage unit 140 stores information of the order of the input event and the coordinate in which the input event is detected, which is used in the lock mode.

The touch screen 150 includes a display unit 153 and a touch sensor 155. Here, the display unit 153 can display various data associated with the state and operation of the portable terminal. In Particular, under the control of the control unit 130, the display unit 153 displays the background image in the standby mode or in the lock mode. Also, under the control of the control unit 130, the display unit 153 can display a function mapped to a particular area of the background image. Further, under the control of the control unit 130, the display unit 153 can display a transparent icon management menu window for mapping the function to the particular area of the background image or editing the mapping.

The touch sensor is mounted on the display unit 153 and detects the input event generated by a contact or release of the contact by an object on a surface of the display unit 153. Here, the touch sensor 155 detects a coordinate of an area of the surface of the display unit 153 in which the input event is detected and provides the detected coordinate to the control unit 130. Generally, in order for the touch sensor 155 to detect the coordinate of the area in which the input event is detected, a virtual grid pattern is displayed on the display unit 155 and each cross point of the grid is assigned a coordinate value. Accordingly, when the input event is detected on the surface of the display unit 153, the touch sensor 155 identifies the cross point of an area in which the input event is detected to detect a coordinate corresponding to the identified cross point. It is described herein that the present invention uses the touch screen 150 in which an input unit and the display unit 153 are integrated. However, the present invention is not limited to this example. Namely, the portable terminal can have the input unit being separate from the display unit, wherein the input unit is implemented as a keypad having physical keys. Here, the user can select a particular area of the background image by using an arrow key of the input unit. Then the control unit 130 can identify the particular area selected by the input unit, map a selected function to the identified area, and store the mapping.

The portable terminal having the above described configuration can map a function to a particular area of the background image according to a user's choice. Also, the portable terminal can perform the function mapped to the particular area selected by the user. The portable terminal can also change a currently displayed image to a preset background image according to a current location of the portable terminal.

Figure 2:
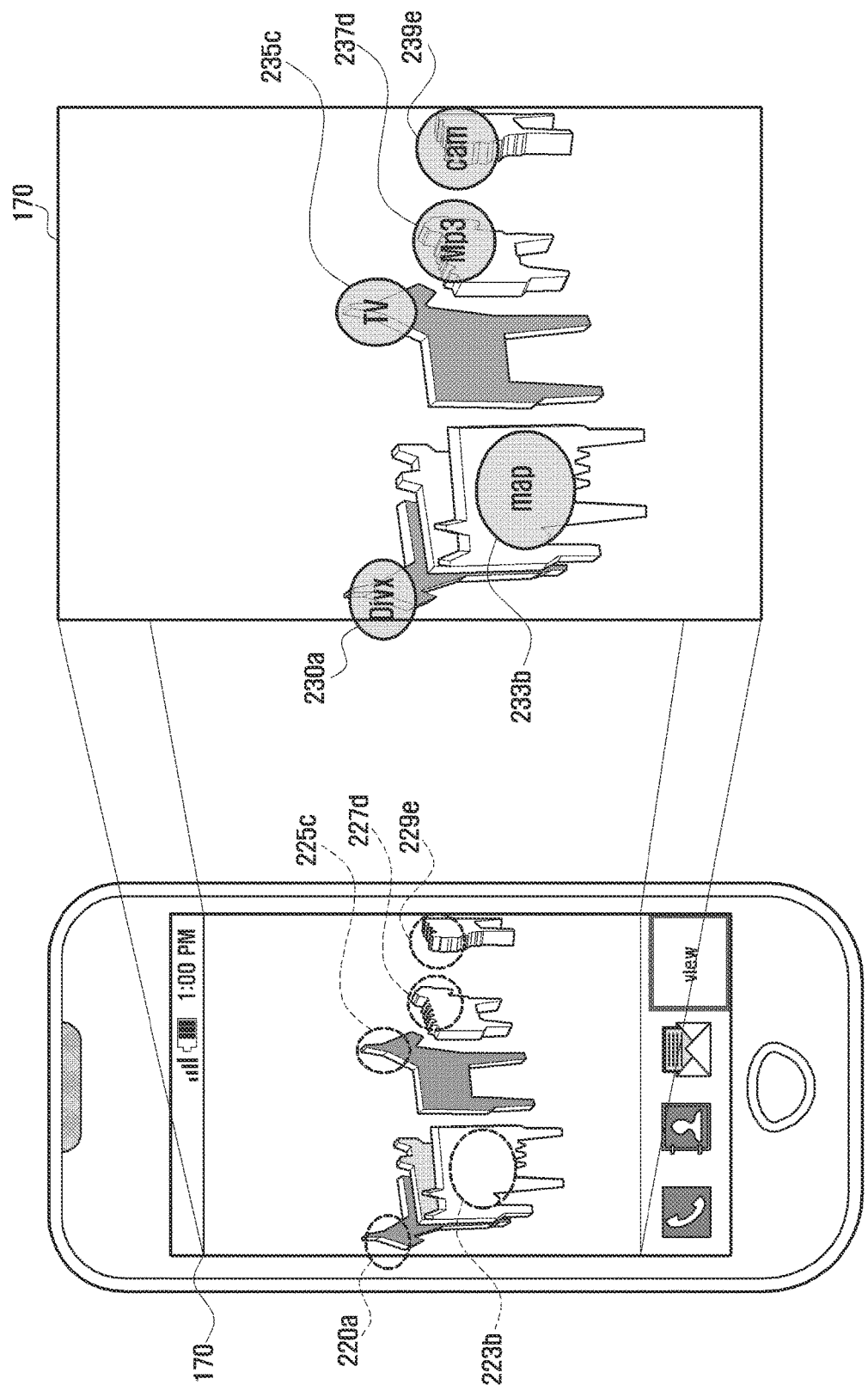
FIG. 2 illustrates a screen of a portable terminal according to an exemplary embodiment of the present invention.

FIG. 2 illustrates a screen of a portable terminal according to an exemplary embodiment of the present invention.

Referring to FIG. 2, the screen 170 of the portable terminal can display the background image according to the user's choice. A function, which can be executed according to the user's choice, is mapped to at least one area of the background image. In FIG. 2, each function is mapped to five areas of the background image. More specifically, a DivX function 230a can be mapped to a first area 220a. A map function 233b can be mapped to a second area 223b. A TeleVision (TV) function 235c can be mapped to a third area 225c. A Moving Picture Experts Group (MPEG)-1 or MPEG-2 Audio Layer 3 (MP3) function 237*d* can be mapped to a fourth area 227*d*. A camera function 239*e* can be mapped to a fifth area 229*e*. Here, an area to which the function is mapped can be varied according to the user's choice. Also, a function mapped to each area can vary according to the user's choice.

Figure 3:
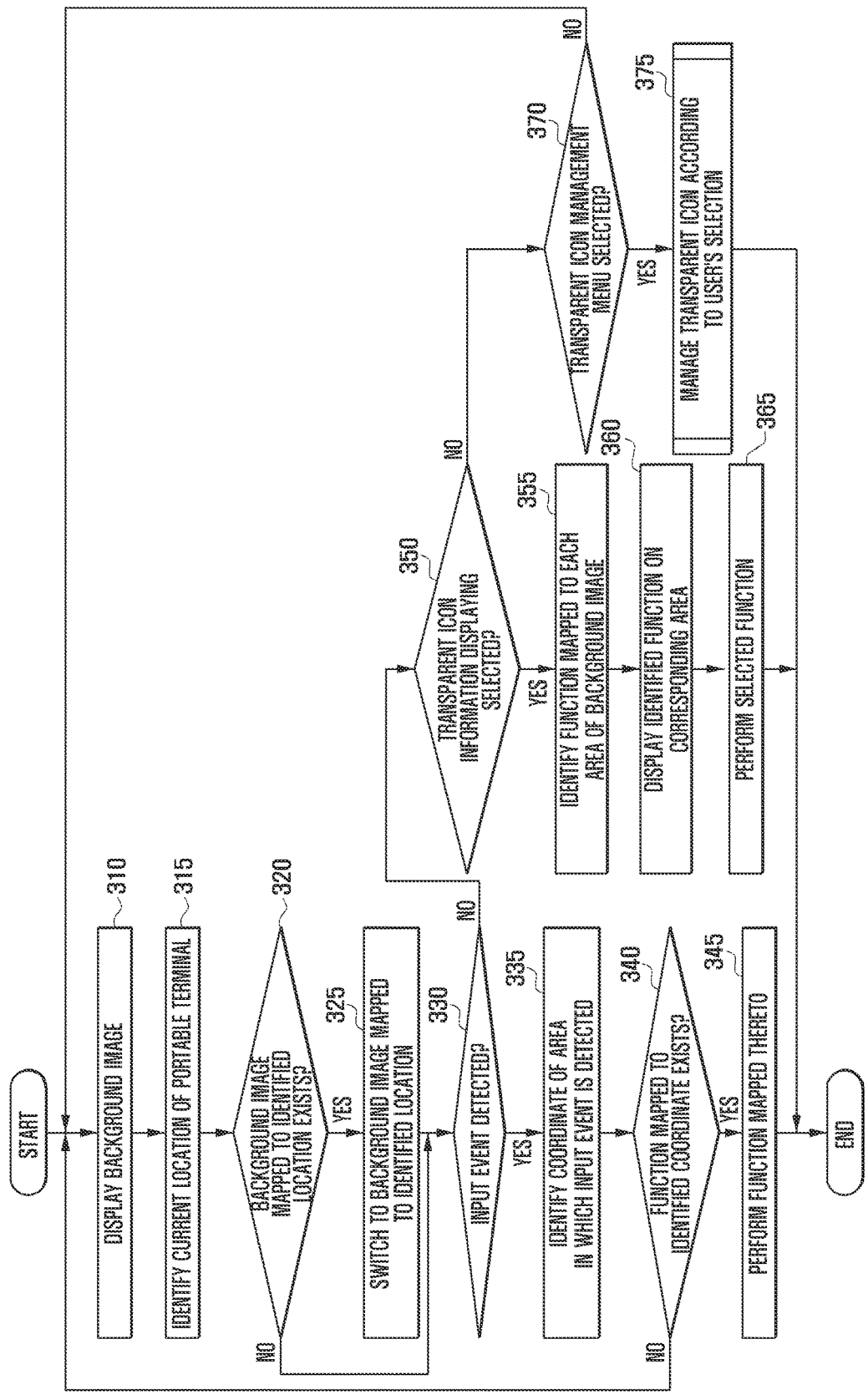
FIG. 3 illustrates a method of utilizing a background image of a portable terminal that changes based on a location of the portable terminal according to an exemplary embodiment of the present invention.

FIG. 3 illustrates a method of utilizing a background image of a portable terminal that changes based on a location of the portable terminal according to an exemplary embodiment of the present invention.

Referring to FIG. 3, the control unit 130 controls the display unit 153 to display a background image in step 310. Here, the background image can be displayed when the portable terminal is in a standby mode or a lock mode.

Next, the control unit 130 controls the location identification unit 120 to identify a current location of the portable terminal in step 315. Also, the control unit 130 determines whether there exists a background image mapped to the identified current location of the portable terminal in step 320. If there exists the background image mapped to the identified current location, the control unit 130 controls the display unit 153 to switch to the corresponding background image to be displayed in step 325. If there exists no background image mapped to the identified current location, the control unit 130 proceeds to step 330.

The control unit 130 determines whether an input event is detected through the touch screen 150 in step 330. If the input event is detected, the control unit 130 identifies a coordinate of the area in which the input event is detected in step 335. The control unit 130 determines whether there exists a function mapped to the identified coordinate in step 340. Here, the control unit 130 can determine whether there exists the function mapped to the identified coordinate by using the transparent icon information 145 stored in the storage unit 140. The transparent icon information 145 includes information about the coordinate corresponding to an area of the background image to which the function is mapped and the function mapped thereto. If there does not exist the function mapped to the identified coordinate, the control unit 130 returns to step 310.

If there exists the function mapped to the identified coordinate, the control unit 130 performs a corresponding function in step 345. Here, the function can be one of executable functions of the portable terminal and can be set as a frequently used function such as lock canceling, message sending, a Digital Multimedia Broadcasting (DMB), or a camera. For example, if the background image is the background image for the lock mode, the control unit 130 can identify the coordinate of the area in which the input event is detected to cancel the lock mode. More specifically, in order to cancel the lock mode based on the input event detected in the particular area of the background image, the control unit 130, when performing a transparent icon setting function, stores in the storage unit 140 the coordinate of the area in which the input event is detected in the background image according to the user's selection in an order of receiving the coordinate. Next, when the input event is detected in the background image of the lock mode, the control unit 130 identifies the area in which the input event is detected and an order of receiving the input event. The control unit 130 can cancel the lock mode based on comparison between the identified order of receiving the input event and the order stored in the storage unit 140.

Returning to step 330, if the input event is not detected, the control unit 130 determines whether transparent icon information displaying function is selected through, for example, a menu in step 350. Here, the transparent icon information displaying means the display of the function and the area to which the function is mapped on the background image in order to identify the function mapped to the particular area of the background image. When the transparent icon information displaying function is selected, the control unit 130 identifies the function mapped to each area of the background image by using the storage unit 140 in step 355. Also, the control unit 130 controls the display unit 153 to indicate the identified function in the corresponding area of the background image in step 360. Next, the control unit 130 performs the function selected by the user in step 365.

Returning to step 350, when the transparent icon information displaying function is not selected, the control unit 130 determines whether a transparent icon management menu is selected in step 370. If the transparent icon management menu is not selected, the control unit 130 returns to step 310. If the transparent icon management menu is selected, the control unit 130 manages the transparent icon according to the user's choice in step 375. Here, a method of managing the transparent icon according to the user's choice in step 375 will be described further below with reference to FIG. 5. After any of steps 345, 365, and 375 the control unit 130 ends the process according to the present exemplary embodiment.

Figure 4:
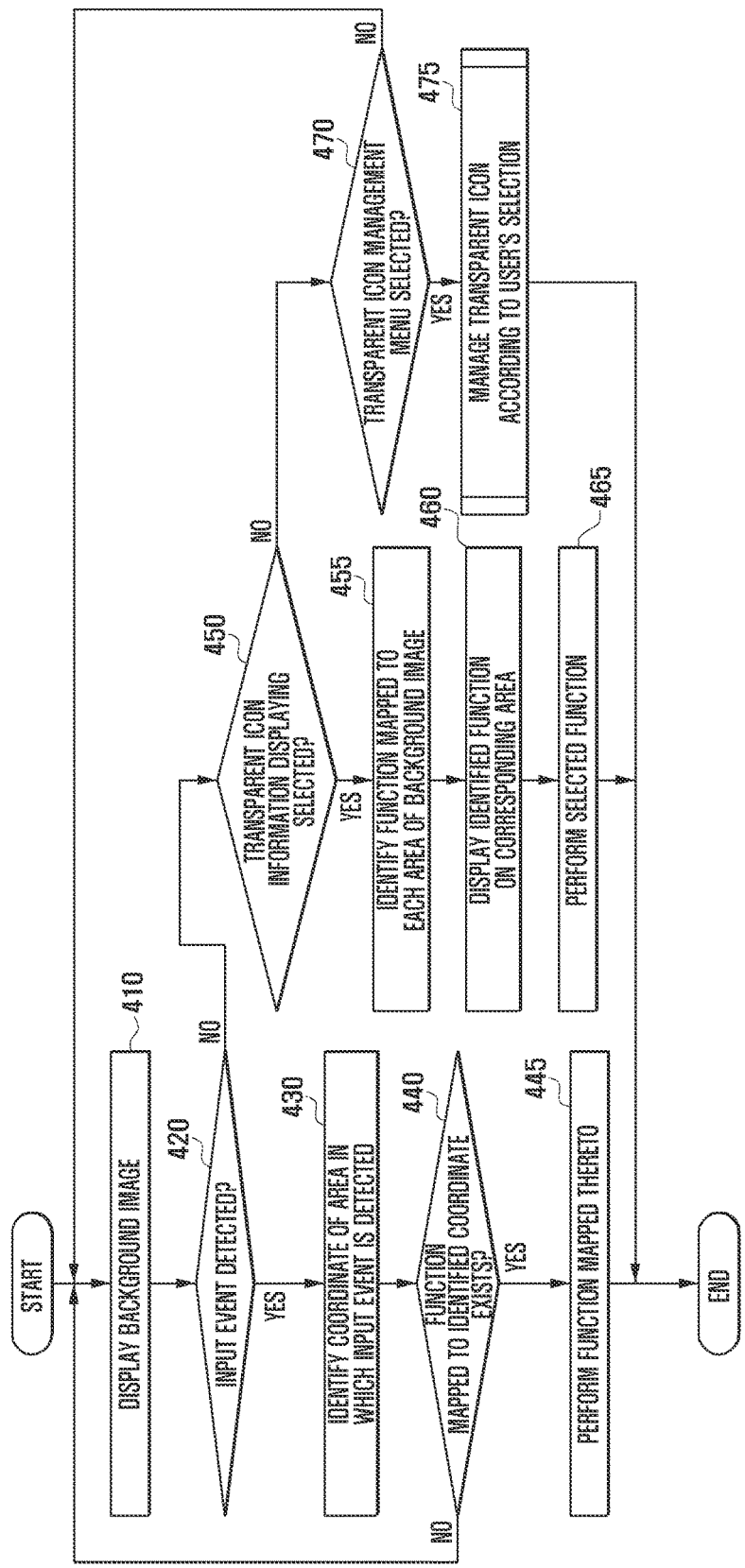
FIG. 4 illustrates a method of utilizing a background image of a portable terminal according to an exemplary embodiment of the present invention.

FIG. 4 illustrates a method of utilizing a background image of a portable terminal according to an exemplary embodiment of the present invention.

Referring to FIG. 4, the control unit 130 controls the display unit 153 to display a background image in step 410. Here, the background image can be displayed when the portable terminal is in a standby mode or in a lock mode.

Next, the control unit 130 determines whether an input event is detected through the touch screen 150 in step 420. When the input event is detected, the control unit 130 identifies the coordinate of the area in which the input event is detected in step 430. Also, the control unit 130 determines whether there exists a function mapped to the identified coordinate in step 440. Here, the control unit 130 can determine whether there exists the function mapped to the identified coordinate by using the transparent icon information 145 stored in the storage unit 140. The transparent icon information 145 includes information about a coordinate corresponding to an area of the background image to which the function is mapped and the function mapped thereto. If there does not exist the function mapped to the identified coordinate, the control unit 130 returns to step 410.

If there exists the function mapped to the identified coordinate, the control unit 130 performs the corresponding function in step 445. Here, the corresponding function can be one of executable functions of the portable terminal and can be set as a frequently used function such as lock canceling, message sending, a DMB, or a camera.

Returning to step 420, when the input event is not detected, the control unit 130 determines whether transparent icon information displaying function is selected through, for example, a menu in step 450. Here, the transparent icon information 145 displaying means the display of the function and the area to which the function is mapped on the background image in order to identify the function mapped to a particular area of the background image. If the transparent icon information displaying function is selected, the control unit 130 identifies the function mapped to each area of the background image by using the storage unit 140 in step 455. Also, the control unit 130 controls the display unit 153 to display the identified function in the corresponding area of the background image in step 460. Next, the control unit 130 performs a function selected by the user in step 465.

Returning to step 450, when the transparent icon information displaying function is not selected, the control unit 130 determines whether a transparent icon management menu is selected in step 470. If the transparent icon management menu is not selected, the control unit 130 returns to step 410. If the transparent icon management menu is selected, the control unit 130 manages the transparent icon according to the user's selection in step 475. Here, a method of managing the transparent icon according to the user's selection at step 475 is described below with reference to FIG. 5. After any of steps 445, 465, and 475, the control unit 130 ends the process according to the present exemplary embodiment.

Figure 5:
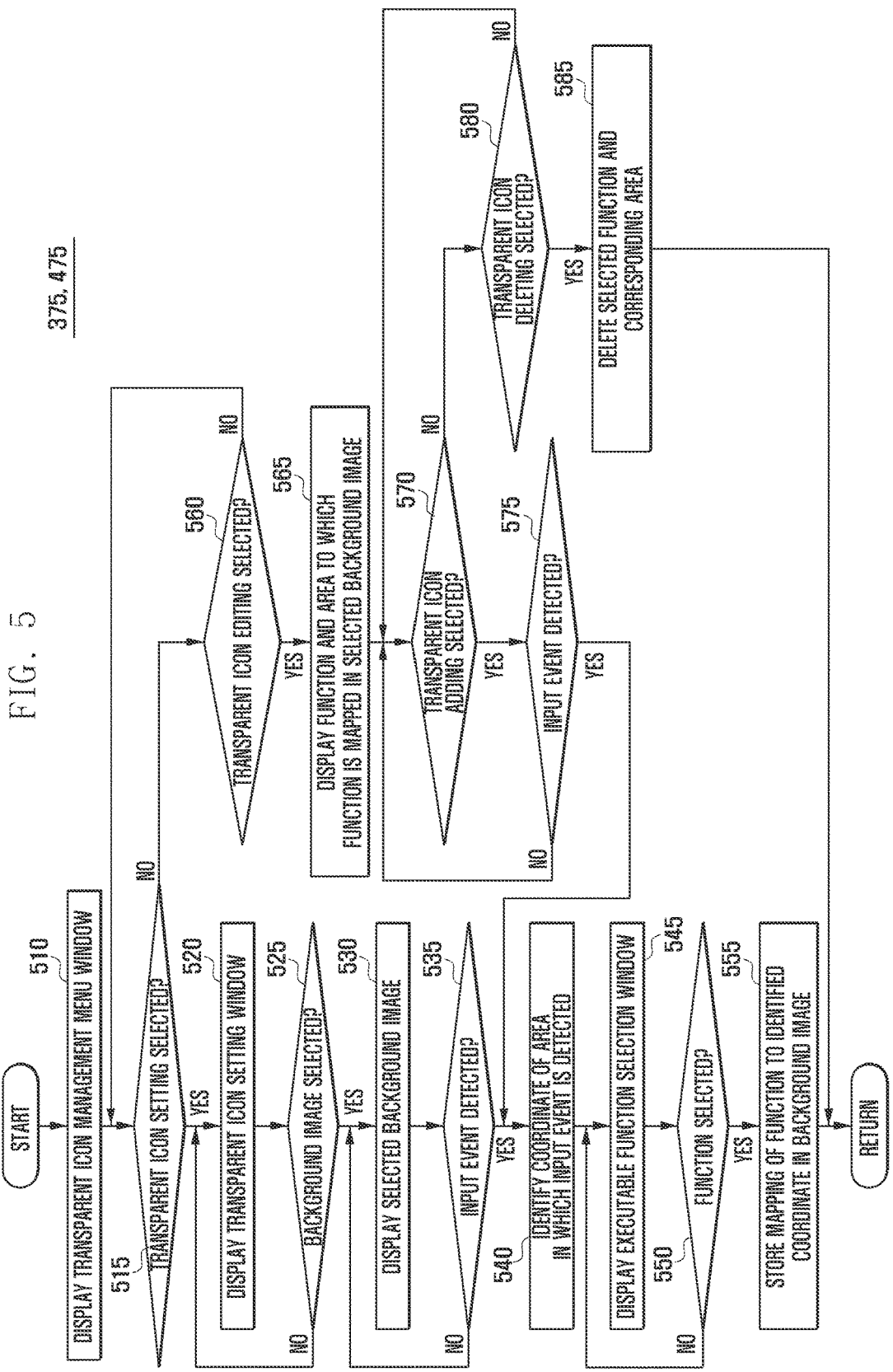
FIG. 5 illustrates a method of managing a transparent icon according to an exemplary embodiment of the present invention.

FIG. 5 illustrates a method of managing a transparent icon according to an exemplary embodiment of the present invention.

Referring to FIG. 5, the control unit 130 controls the display unit 153 to display a transparent icon management menu window in step 510. Here, the transparent icon management menu window includes an icon for a transparent icon setting function, which allows mapping a function to a particular area of the background image, and an icon for selecting a transparent icon editing function, which allows editing of the transparent icon.

Next, the control unit 130 determines whether the transparent icon setting function is selected through the touch screen 150 in step 515. If the transparent icon setting function is selected, the control unit 130 controls the display unit 153 to display a transparent icon setting window in step 520. The transparent icon setting window can include a background image selection icon for selecting the background image and a function selection icon for selecting a function that can be mapped to a particular area of the background image.

The control unit 130 determines whether the background image selection icon is selected in the transparent icon selection window through the touch screen 150 in step 525. If the background image selection icon is not selected, the control unit 130 returns to step 520. If the background image selection icon is selected, the control unit 130 can control the display unit 153 to display all images that can be used as the background image. Also, when the background image is selected among the displayed images, the control unit 130 controls the display unit 153 to display the selected image as the background image in step 530. Next, the control unit 130 determines whether the input event is detected through the touch screen 150 in step 535. When the input event is not detected, the control unit 130 returns to step 530.

When the input event is detected, the control unit 130 identifies the coordinate of the area in which the input event is detected in step 540. The control unit 130 controls the display unit 153 to display a function selection window for selecting an executable function in step 545. Here, in the function selection window, the executable functions of the portable terminal may be displayed in a list format.

Next, the control unit 130 determines whether a function is selected in the function selection window through the touch screen 150 in step 550. When the function is not selected, the control unit 130 returns to step 545. When the function is selected, the control unit 130 controls the storage unit 140 to store the transparent icon information 145, which includes the identified coordinate of the selected background image and the selected function mapped thereto in step 555. Here, the control unit 130 can control the storage unit 140 to store the function and the coordinate of the area to which the function is mapped in a table format for each background image. For example, when the selected function is for the lock mode, the control unit 130 stores the coordinate of the area in which the input event is detected in an order of receiving the input event in the storage unit 140. When the selected function is for transmitting a message, the control unit 130 maps the coordinate of the area in which the input event is detected to a message transmitting function and stores the mapping in the storage unit 140.

Returning to step 515, if the transparent icon setting function is not selected, the control unit 130 determines whether the transparent icon editing function is selected in the transparent icon management menu window through the touch screen 150 in step 560. When the transparent icon editing function is not selected, the control unit 130 returns to step 515.

When the transparent icon editing function is selected, the control unit 130 controls the display unit 153 to display the function and the area to which the function is mapped in the selected background image in step 565. Here, the control unit 130 can control the display unit 153 to display a currently set background image. Alternatively, the control unit 130 can control the display unit 153 to display all background images to which functions are mapped in a thumbnail format. Also, the control unit 130 can enlarge the background image on the display unit 153 selected by the user among the thumbnail background images and display the enlarged background image. Here, the control unit 130 can control the display unit 153 to display an "add transparent icon" button corresponding to a function for adding the area to which the function is mapped in the background image and a "delete transparent icon" button corresponding to a function for deleting the area to which the function is mapped.

Also, the control unit 130 determines whether a transparent icon adding is selected to add the area to which the function is mapped in the background image through the touch screen 150 in step 570. When the transparent icon adding is selected, the control unit 130 returns to step 570. When the transparent icon adding is selected, the control unit 130 determines whether the input event is detected through the touch screen 150 in step 575. If the input event is detected, the control unit 130 proceeds to step 540. In other words, when the input event is detected, the control unit 130 identifies the coordinate of the area in which the input event is detected. Also, when the function is selected to be mapped to the identified coordinate, the control unit 130 stores the selected function and the identified coordinate together with the corresponding background image in the storage unit 140.

Returning to step 570, when the transparent icon adding is not selected, the control unit 130 determines whether a transparent icon deleting function is selected through the touch screen 150 in step 580. When the transparent icon deleting function is not selected, the control unit 130 returns to step 570. When the transparent icon deleting function is selected, the control unit 130 deletes information about a selected function and a corresponding area thereof from the storage unit 140 in step 585. Specifically, when the input event is detected through the touch screen 150, the control unit 130 identifies the coordinate of the area in which the input event is detected. Also, the control unit 130 controls the storage unit 140 to delete the identified coordinate and the function mapped thereto from the transparent icon information 145. After either of steps 555 and 585, the control unit 130 ends the process according to the present exemplary embodiment.

Figure 6:
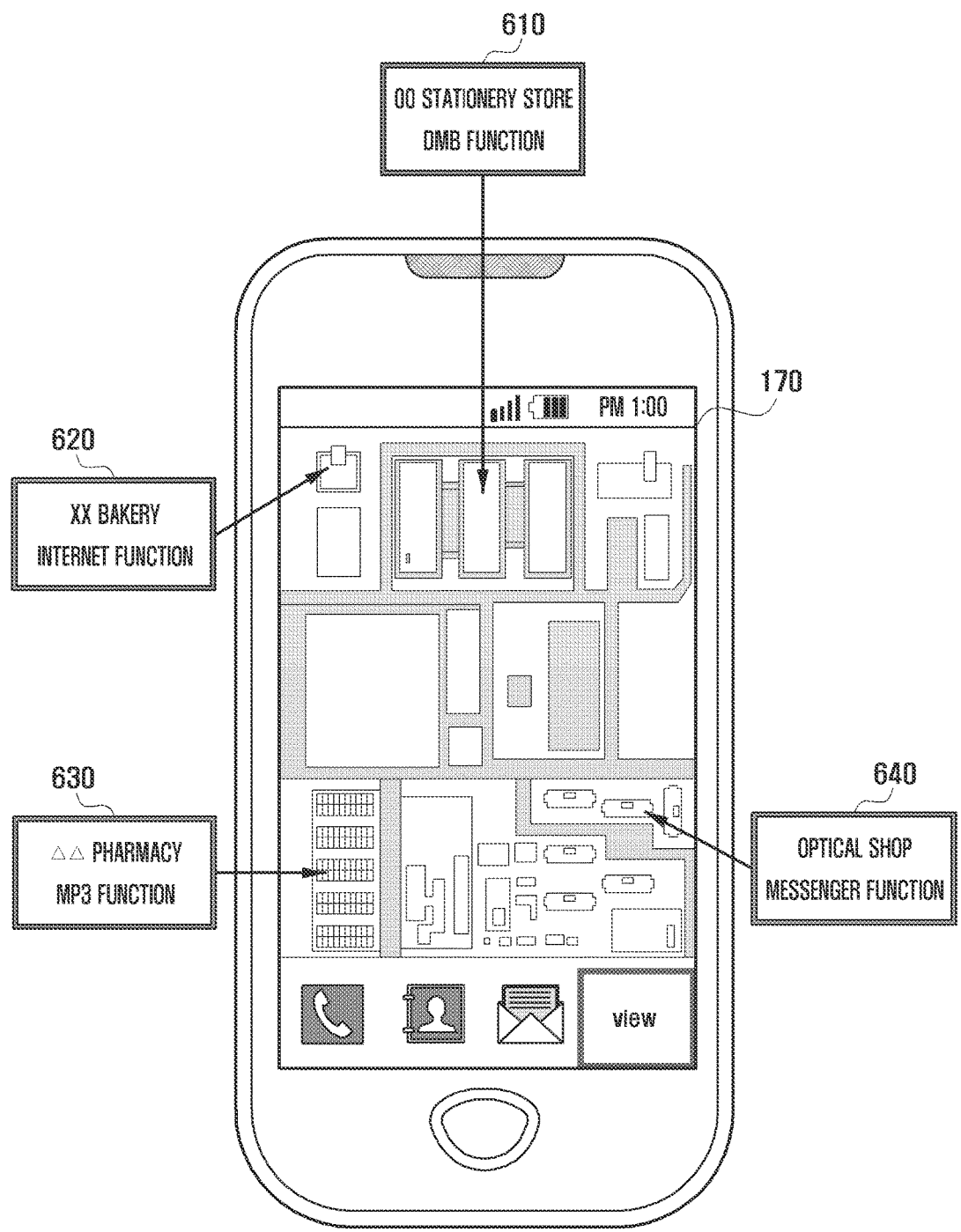
FIG. 6 illustrates a screen with a background image of a portable terminal that changes based on a location of the portable terminal according to an exemplary embodiment of the present invention.

FIG. 6 illustrates a screen with a background image of a portable terminal that changes based on a location of the portable terminal according to an exemplary embodiment of the present invention.

Referring to FIG. 6, the display screen 170 of the portable terminal can display the background image according to the user's selection. Here, when the location of the portable terminal is changed, an image corresponding to the changed location can be displayed as the background image of the portable terminal. As shown in FIG. 6, when the changed background image is a map indicating a particular area, the portable terminal can display detailed information of buildings located in the particular area. Also, the portable terminal can indicate a function mapped to an area of the background image corresponding to each building. Namely, ○○ stationery store and a DMB function 610 can be displayed in a first area of the background image, XX bakery and internet function 620 can be displayed in a second area, ΔΔ pharmacy and an MP3 function 630 can be displayed in a third area, and an optical shop and a messenger function 640 can be displayed in a fourth area. Although it is described that the background image includes the detailed information of the building displayed therein, the present invention is not limited thereto. Namely, the portable terminal can indicate the name of a place as well as the name of the building.

In this manner, a user can set a particular function mapped to a selected background image or designate a password which is used to cancel the lock mode. Also, the user may easily select a desired function by displaying the background image with the function mapped thereto.

According to exemplary embodiments of the present invention, the user may select various functions using the background image displayed on the portable terminal. Also, the portable terminal can provide a user interface specified according to user's preferences. Further, the portable terminal according to exemplary embodiments of the present invention allows the user to create a password key by using the user's personal setting in unlimited ways. Therefore, even when the portable terminal is lost, a risk of exposing personal information to a stranger can be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of accessing an application in a portable terminal, the method comprising:
   identifying a current location of the portable terminal;
   displaying a background image mapped to the current location of the portable terminal, the background image including a plurality of image objects each mapped respectively to each of a plurality of applications executable in the portable terminal;
   detecting a first input event selecting two or more image objects from the plurality of image objects in a particular order while the background image is displayed in a locked state of the portable terminal;
   entering an unlocked state of the portable terminal if the particular order matches a predetermined order for unlocking the portable terminal without executing any of two or more applications mapped to the two or more image objects selected by the detected first input event;
   detecting a second input event selecting an image object from the plurality of image objects while the portable terminal is in the unlocked state; and
   executing an application of the plurality applications mapped to the selected image object based on detecting the second input event.

2. The method according to claim 1, further comprising:
   displaying an icon management menu to manage the mapping of the plurality of applications to the plurality of image objects, the icon management menu including an icon editing function and an icon deleting function;
   displaying a second image object of the plurality of image objects for mapping to a second application of the plurality of applications when an icon setting function is selected in the icon management menu; and
   storing the mapping of the second image object and the second application as icon information when the second application is selected to be mapped to the second image object.

3. The method according to claim 2, further comprising:
   displaying an indicator associated with a third application to be mapped to the selected first image object when the icon editing function is selected in the icon management menu; and
   storing the mapping when an icon adding function is selected.

4. The method according to claim 2, further comprising:
   deleting, when the icon deleting function is selected, information associated with the application mapped to the selected first image object.

5. The method according to claim 2, further comprising:
   determining whether the icon management menu is selected;
   when the icon management menu is selected, displaying in a thumbnail format all background images to which the plurality of applications are mapped when the icon editing function is selected in the icon management menu;
   enlarging a background image that is selected among the thumbnail background images;
   displaying the enlarged background image;
   mapping an image object of the enlarged background image to a selected application of the plurality of applications; and
   storing the mapping result when an icon adding function is selected.

6. A portable terminal comprising:
   a display;
   a touch screen; and
   at least one processor configured to:
   identify a current location of the portable terminal,
   display a background image mapped to the current location of the portable terminal, the background image including a plurality of image objects each mapped respectively to each of a plurality of applications executable in the portable terminal,
   detect a first input event selecting two or more image objects from the plurality of image objects in a particular order while the background image is displayed in a locked state of the portable terminal,
   enter an unlocked state of the portable terminal if the particular order matches a predetermined order for unlocking the portable terminal without executing any of two or more applications mapped to the two or more image objects selected by the detected first input event, detect a second input event selecting an image object from the plurality of image objects while the portable terminal is in the unlocked state, and execute an application of the plurality applications mapped to the selected image object based on detecting the second input event.

7. The portable terminal according to claim 6, further comprising:

a storage unit, wherein the at least one processor is further configured to:

display an icon management menu to manage the mapping of the plurality of applications to the plurality of image objects, the icon management menu including an icon editing function and an icon deleting function, and display a second image object of the plurality of image objects for mapping to a second application of the plurality of applications when an icon setting function is selected in the icon management menu, and wherein the storage is configured to store the mapping of the second image object and the second application mapped thereto in the background as icon information based on control of the at least one processor.

8. The portable terminal according to claim 6, wherein the at least one processor is further configured to:

display an icon management menu to manage the mapping of the plurality of applications to the plurality of image objects, the icon management menu including an icon editing function and an icon deleting function, and wherein, when an icon setting function is selected in the icon management menu, the at least one processor is further configured to:

display a second image object of the plurality of image objects for mapping to a second application of the plurality of applications, and store the mapping of the second image and the second application an icon information when the second application is selected to be mapped to the second image object.

9. The portable terminal according to claim 8, wherein the at least one processor is further configured to:

display an indicator associated with a third application to be mapped to the selected first image object when the icon editing function is selected in the icon management menu, and store a mapping thereof when an icon adding function is selected.

10. The portable terminal according to claim 8, wherein the at least one processor is further configured to delete information associated with the application mapped to the selected first image object when the icon deleting function is selected.

11. The portable terminal according to claim 8, wherein the at least one processor is further configured to:

determine whether the icon management menu is selected, when the icon management menu is selected, display, in a thumbnail format, all background images to which the plurality of applications are mapped when the icon editing function is selected in the icon management menu, enlarge a background image that is selected among the thumbnail background images, display the enlarged background image, map an image object of the enlarged background image to a selected application of the plurality of applications, and store the mapping result when an icon adding function is selected.

12. The method according to claim 1, wherein each of the plurality of image objects includes an icon representing an application of the plurality of applications, and wherein the icon is invisible until a predefined input event is detected.

13. The portable terminal according to claim 6, wherein each of the plurality of image objects includes an icon representing an application of the plurality of applications, and wherein the icon is invisible until a predefined input event is detected.

14. The method according to claim 1, further comprising:

detecting a third input event selecting a menu to display at least one notification indicating a mapping between the plurality of applications and the plurality of image objects; and displaying, upon detection of the third input event, the at least one notification, wherein each notification of the at least one notification is displayed adjacent to a corresponding image object of the plurality of image objects based on the mapping.

15. The portable terminal according to claim 6, wherein the at least one processor is further configured to:

detect a third input event selecting a menu to display at least one notification indicating a mapping between the plurality of applications and the plurality of image objects, and display, upon detection of the third input event, the at least one notification, wherein each notification of the at least one notification is displayed adjacent to a corresponding image object of the plurality of image objects based on the mapping.

16. The method according to claim 1, further comprising:

detecting a change of the current location of the portable terminal; and changing the background image to a background image mapped to the changed current location of the portable terminal based on the detected change of the current location of the portable terminal.

17. The portable terminal according to claim 6, wherein the at least one processor is further configured to:

detect a change of the current location of the portable terminal, and change the background image to a background image mapped to the changed current location of the portable terminal based on the detected change of the current location of the portable terminal.

* * * * *